Sept. 5, 1933.  O. E. ANDERSON  1,925,622
SHRUBBERY IRRIGATOR
Filed Nov. 3, 1932
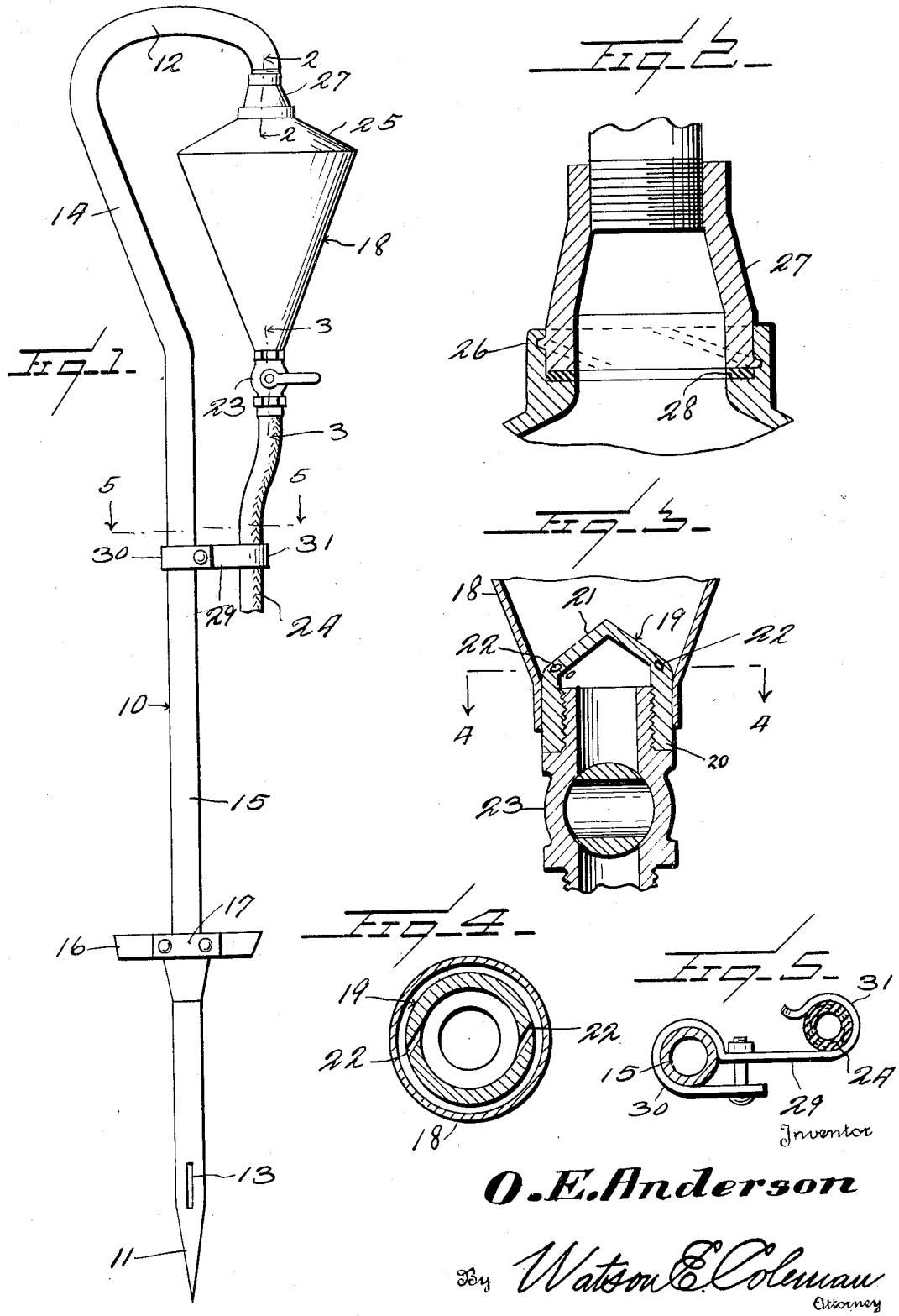
O. E. Anderson
By Watson E. Coleman
Attorney Patented Sept. 5, 1933

1,925,622

UNITED STATES PATENT OFFICE

1,925,622

SHRUBBERY IRRIGATOR

Oscar Ernest Anderson, Chanute, Kans.

Application November 3, 1932. Serial No. 641,094

9 Claims. (Cl. 47—49)

This invention relates to irrigators and more particularly to irrigators for use with shrubbery or the like.

An object of this invention is to provide an irrigating means for shrubbery which can be readily transported, and which is provided with means not only for the supplying of moisture to the roots of a shrub, but also for supplying a fertilizer.

Another object of this invention is to provide a device of this kind which is exceedingly simple in construction and which can, therefore, be cheaply manufactured.

A further object of this invention is to provide a device of this kind which is so constructed that the water or moisture is thoroughly mixed with the fertilizer, the fertilizer being of a character to substantially dissolve in the water or other liquid.

The above and various other objects and advantages of this invention will in part be described and in part be understood from the following detailed description of the present preferred embodiment, the same being illustrated in the accompanying drawing, wherein:—

Figure 1 is a detail side elevation partly broken away of a device constructed according to the preferred embodiment of this invention.

Figure 2 is an enlarged fragmentary sectional view taken on the line 2—2 of Figure 1.

Figure 3 is an enlarged fragmentary sectional view taken on the line 3—3 of Figure 1.

Figure 4 is a sectional view taken on the line 4—4 of Figure 3.

Figure 5 is a sectional view taken on the line 5—5 of Figure 1.

Referring to the drawing wherein like numerals of reference designate corresponding parts throughout the several views, the numeral 10 designates generally a pipe of desired diameter and length, which is provided at the lower end thereof with a point or reduced end portion 11 provided with a discharge opening 13, at a point spaced upwardly from the end of the point 11. This pipe or irrigator 10 is provided with a handle 12 connected to the body of the irrigator 10 by means of a connecting member 14.

In practice, the point 11 and the straight body portion 15, together with the handle 12 and the connecting member 14, may be formed integrally with each other so that a liquid may be passed through the interior of the device. A pressing member 16 is secured as by a clamp 17 to the body 15 at a point upwardly from the point 11, and this pressing member constitutes a stopping means to limit the projection of the point 11 into the ground.

In order to simultaneously fertilize the soil during the irrigation thereof, I have provided a substantially funnel-shaped mixing chamber 18, which has the apex thereof disposed downwardly, and this lower end portion has a circulating head, generally designated as 19, mounted therein.

This head 19 comprises a cylindrical body 20 having a cone-shaped hood or top 21, and the body 20 as well as the top 21, are hollow and there are provided a plurality of discharge ports 22 which are arranged in a manner to provide a circular motion to the water which is discharged from the interior of the circulator 19 into the mixing chamber 18. The cylindrical body portion 20 is preferably provided with threads on the interior thereof, and a valve member 23 is threaded at one side into the body 20 and the other side of the valve 23 is connected to a flexible pipe or hose 24. The upper portion of the mixing chamber 18 tapers inwardly and upwardly, as at 25, and this top portion 25 is provided with a threaded discharge opening 26 for threadably receiving a plug 27. This plug 27 is in turn threaded onto the free end portion of the handle 12.

A gasket or other sealing member 28 is interposed between the plug 27 and the top of the mixing chamber 18. Preferably, the chamber 18 is threaded onto the plug 27 by a fractional turn so that this chamber can be readily removed for filling of the interior thereof with the desired fertilizing material.

A hose clamp comprising a strap 29 having a looped end portion 30 engaging about the body 15 of the irrigator and having a looped end portion 31 is adapted to engage the hose 24 below the valve 23 so as to prevent bending or cracking of the hose at the connection of the end of the hose with the valve. This clamp 31 has one portion thereof free so that the hose can be slipped onto the clamp without unscrewing the clamp.

In the use and operation of this device, the hose 24 is adapted to be connected to a suitable source of water supply under pressure and after the mixing chamber 18 is filled with the desired fertilizer in the form of a fertilizer capable of being dissolved in water or the like, the irrigating point 11 is pressed into the ground by applying a foot onto the laterally extending portions of the pressing member 16. The discharge opening 13 is turned toward the shrub which it is desired to irrigate, and the valve 23 may then be opened so as to permit the water under pressure to pass upwardly in a circular motion into the mixing chamber 18. By discharging the water in the mixing chamber 18 in a circular motion, the fertilizer is thoroughly stirred up and can be more readily dissolved than if a straight connection be formed between the valve and the mixing chamber. This nozzle 19 also provides means for reducing the pressure of the water so that it will not be discharged from the irrigating port 13 at an excessive pressure. Prior to the turning on of the valve 23, the mixing chamber or fertilizer container 18 is filled with the desired fertilizer by turning the receptacle 18 sufficiently to release the receptacle from the connection 27 carried by the upper end of the irrigator 10.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. An irrigator comprising a hollow member, a member carried by the first member and adapted to be projected into the ground, said second member having a discharge port, means for connecting the first member to a source of liquid supply, and means for releasably holding the portion of the connecting means in spaced relation to the second member.

2. An irrigator comprising a tubular member, an apertured ground piercing member carried by one end of the tubular member, a flexible connection, means for securing the connection to the other end of the tubular member, said flexible member having one end thereof connected to a source of liquid supply under pressure, and means for releasably holding the flexible member in spaced relation to the tubular member.

3. An irrigator comprising an elongated tubular member, a handle carried by one end of the member, a ground piercing point carried by the opposite end of the member, said point having a discharge port therein, means intermediate the ends of the tubular member to force the point into the ground, means for connecting the other end of the member to a source of liquid supply, and means for releasably holding a portion of the connecting means in spaced relation to the tubular member.

4. An irrigator comprising a tubular body, a ground piercing point carried by one end of the body, said point having a discharge opening therein, a flexible member connected at one end to a source of liquid supply and at the other end to the other end of the body, a valve interposed between the body and the flexible member, and means for releasably holding the flexible member in spaced relation to the tubular body.

5. An irrigator comprising a hollow body, a ground piercing point carried by one end of the body, said point having a liquid discharge opening therethrough, means for connecting the body to a source of liquid supply under pressure, and means interposed between said connecting means and the body to mix a fertilizer with the liquid.

6. An irrigator comprising a hollow body, a ground piercing point carried by one end of the body and having a discharge port therethrough, means carried by the body intermediate the ends thereof to facilitate the forcing of the point into the ground, a handle formed with the other end of the body, means for connecting the other end of the body to a source of liquid supply, and means for commingling a fertilizer with the liquid for projection through the discharge port.

7. An irrigator comprising a hollow body, a ground piercing point carried by one end of the body, means for forcing the point into the ground, a handle formed with the other end of the body, a flexible connecting member connected at one end to a source of liquid supply and at the other end to the other end of the body, a fertilizer chamber interposed between the flexible member and the body, and means for discharging the liquid from the flexible member into the fertilizer chamber in a spiral motion.

8. An irrigator comprising a hollow body, a ground piercing member carried by one end of the body and having a discharge port therethrough, means for forcing the point into the ground, a fertilizer chamber, means for connecting one end of the chamber to the other end of the body, a flexible member connected at one end to a source of liquid supply at the other end of the chamber, and a valve interposed between the other end of the flexible member and the other end of the fertilizer chamber.

9. An irrigator comprising a hollow body, a ground piercing member carried by one end of the body and having a discharge opening therethrough, means carried by the body intermediate the ends thereof to facilitate the projection of the ground piercing member into the ground, a fertilizer chamber, threaded connecting means engaging one end of the chamber and the other end of the body to connect the chamber to the body, means for discharging a liquid into the chamber in a manner to agitate a fertilizer positioned therein, and a valve engaging the other end of the chamber.

OSCAR ERNEST ANDERSON.